United States Patent [19]
Kritchever et al.

[11] Patent Number: 5,495,672
[45] Date of Patent: Mar. 5, 1996

[54] TUBE CUTTER

[75] Inventors: Simon Kritchever, Glenview; Miles J. Dubinsky, Carol Stream, both of Ill.

[73] Assignee: The Pullman Co., Lebanon, N.J.

[21] Appl. No.: 297,228

[22] Filed: Aug. 29, 1994

[51] Int. Cl.⁶ ..................................................... B26D 3/16
[52] U.S. Cl. ................................................. 30/97; 30/101
[58] Field of Search ............................... 30/94, 97, 101, 30/102; 82/96, 97, 113

[56] References Cited

U.S. PATENT DOCUMENTS

| | | | |
|---|---|---|---|
| 1,945,949 | 2/1934 | Myers | 30/102 |
| 3,118,227 | 1/1964 | Samuels et al. | 30/102 |
| 3,335,492 | 8/1967 | Spiro | 30/101 |
| 3,665,604 | 5/1972 | Kowal | 30/102 |
| 4,953,292 | 9/1990 | Tobey | 30/97 |
| 5,088,196 | 2/1992 | Fukuda | 30/102 |
| 5,206,996 | 5/1993 | McDaniel | 30/101 |
| 5,315,759 | 5/1994 | Mashata | 30/97 |
| 5,345,682 | 9/1994 | Dubinsky et al. | 30/102 |

OTHER PUBLICATIONS

Supertool–Japanese Brochure; 2 pages.

*Primary Examiner*—Hwei-Siu Payer
*Attorney, Agent, or Firm*—William Squire

[57] ABSTRACT

A tube cutter unit in one embodiment with self centering tube cutting and supporting jaws is rotated by a power drive unit for cutting a tube. The jaws are free to engage the tube without spring load. After engagement with the tube, a relatively high load spring is deflected to induce a tube cutting force on the jaws. The amount of deflection of the spring determines the depth of cut. A separate tool operating socket is also rotatably driven with the cutter unit. The cutter unit is coupled to the drive by a one way clutch. The drive is reversible to selective operate the cutter unit. In a second embodiment, a cutter unit without self centering jaws is separated from a power drive for manually operation and connected to the power drive for power operation. The power operator is reversible for selectively operating the cutter unit. The latter cutter unit also does not provide a spring load on the jaws except for providing a cutting force after the jaws engage the tube being cut. The handle of the assembly is secured to the drive which is mounted in a first housing. The drive and first houisng is mounted in an assembly second housing. The second housing is selectively released from the first housing so the drive and first housing as a unit can be manually rotated with the handle relative to the second housing. This manually rotates the cutter unit.

41 Claims, 10 Drawing Sheets

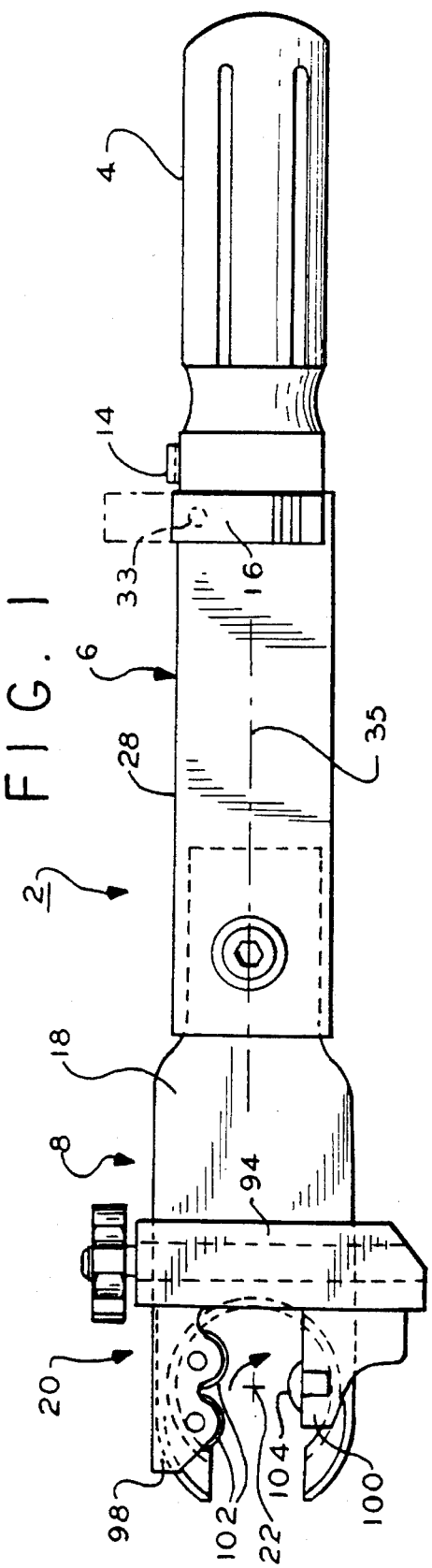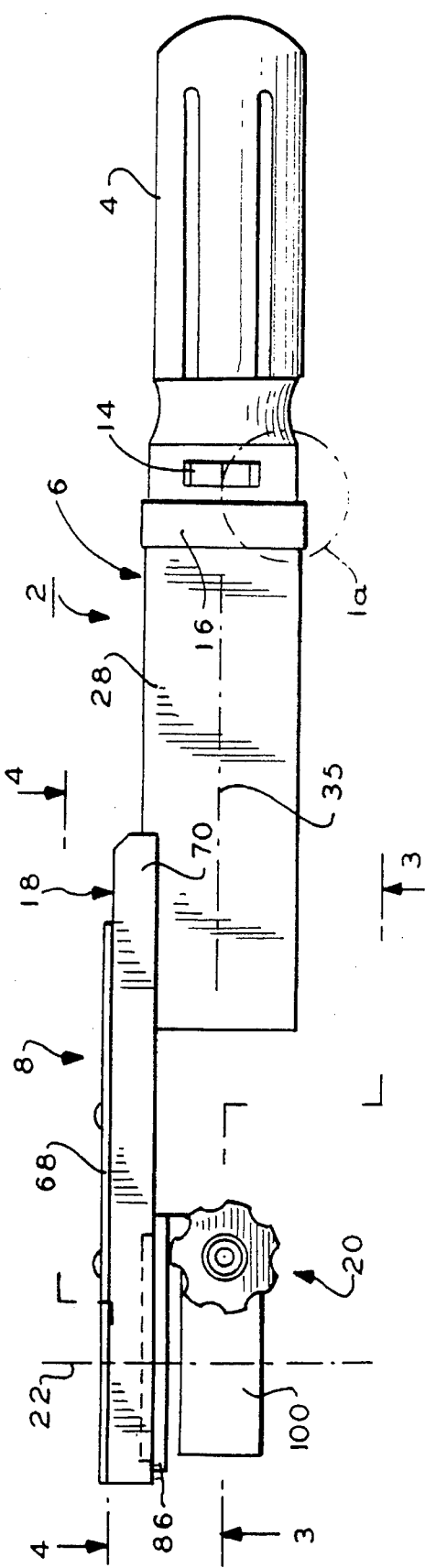

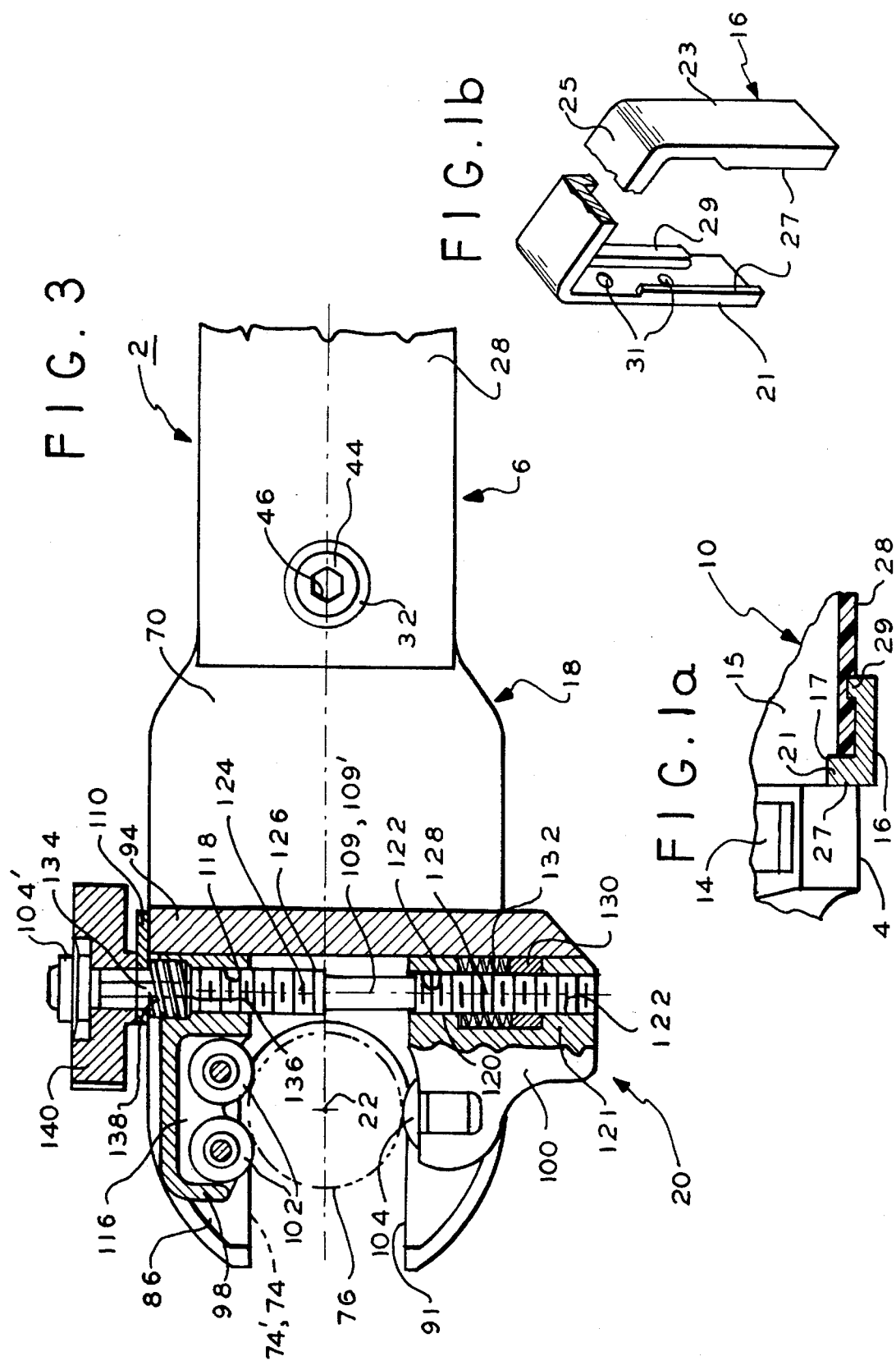

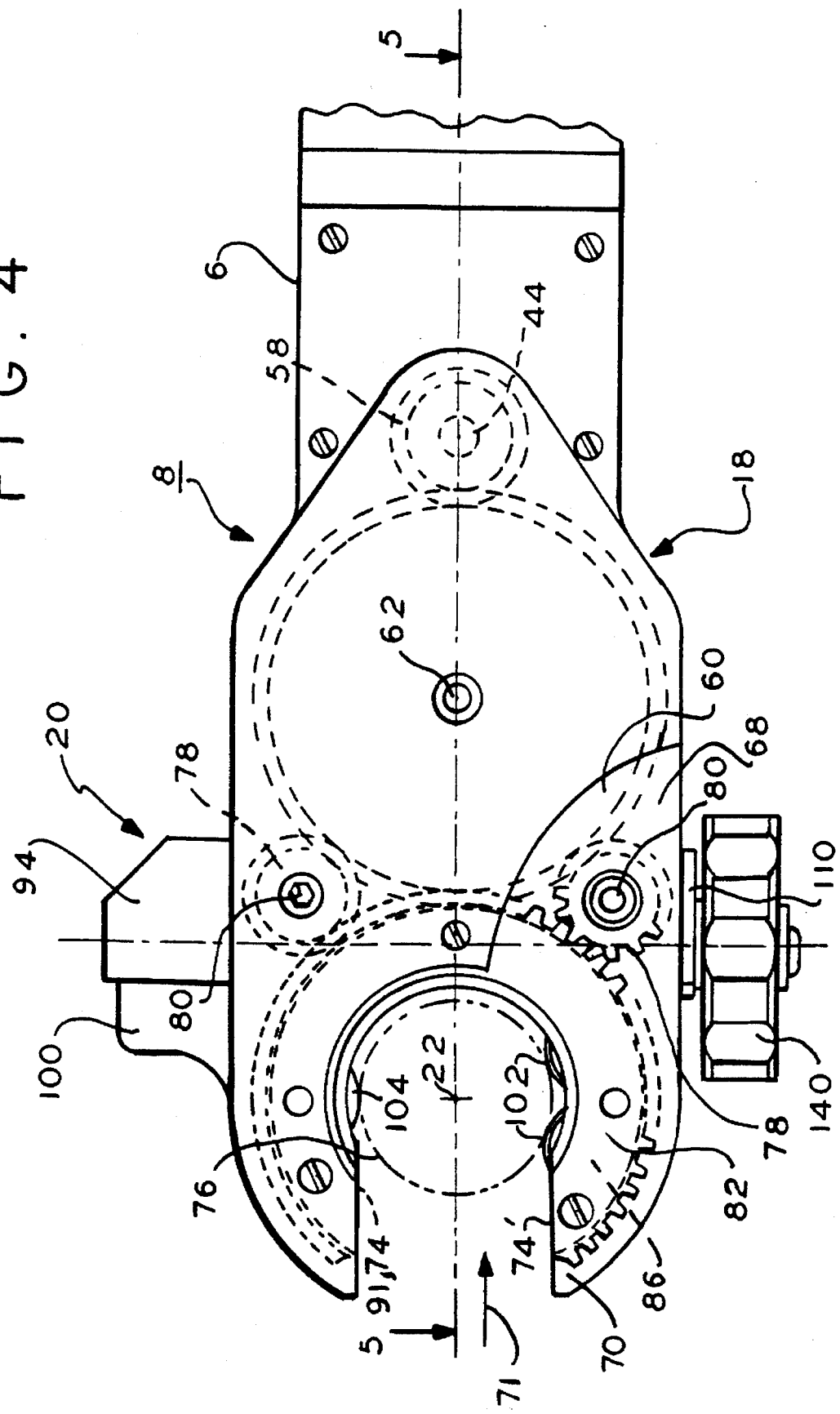

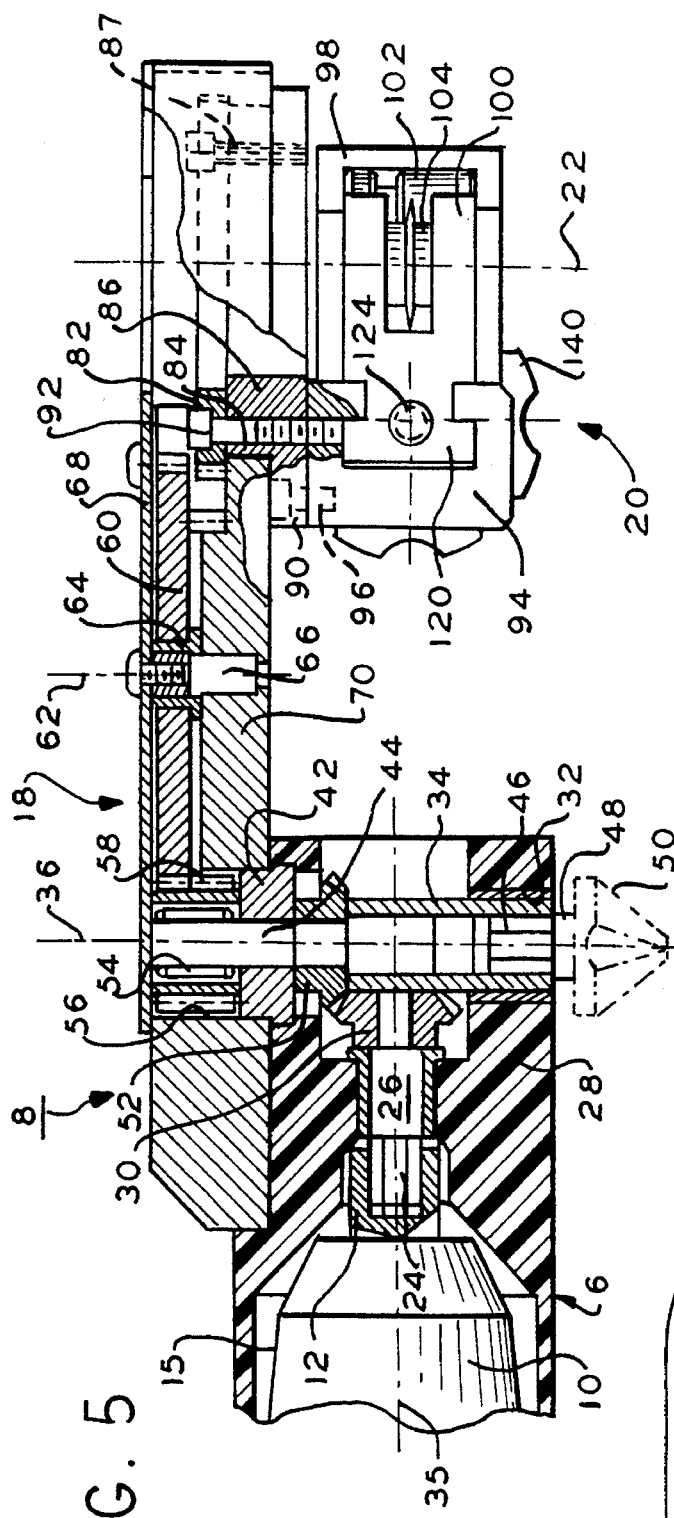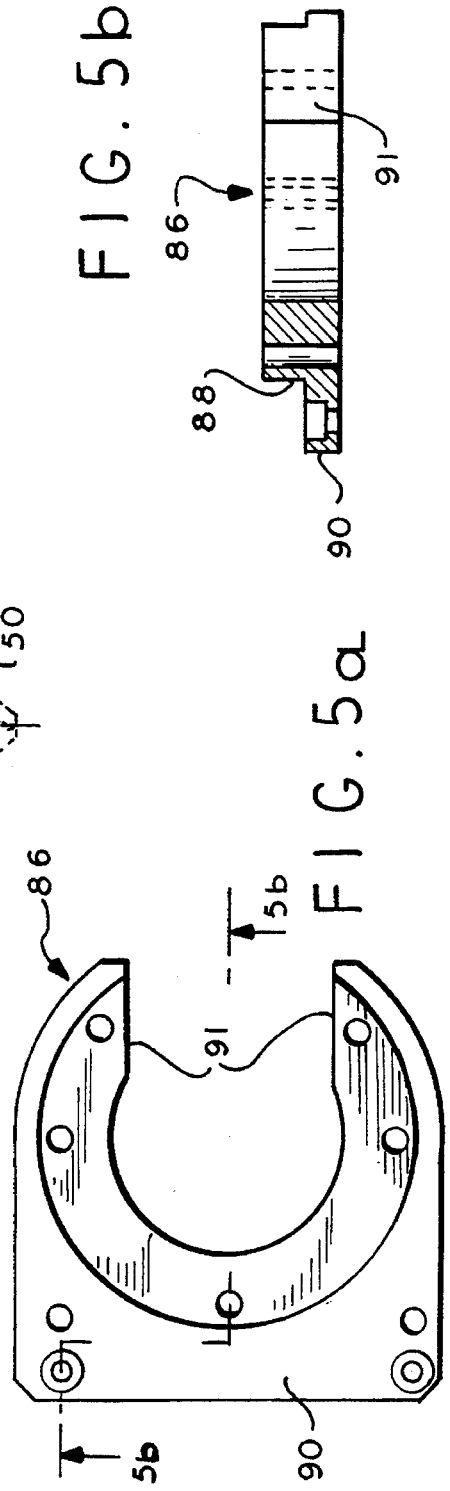

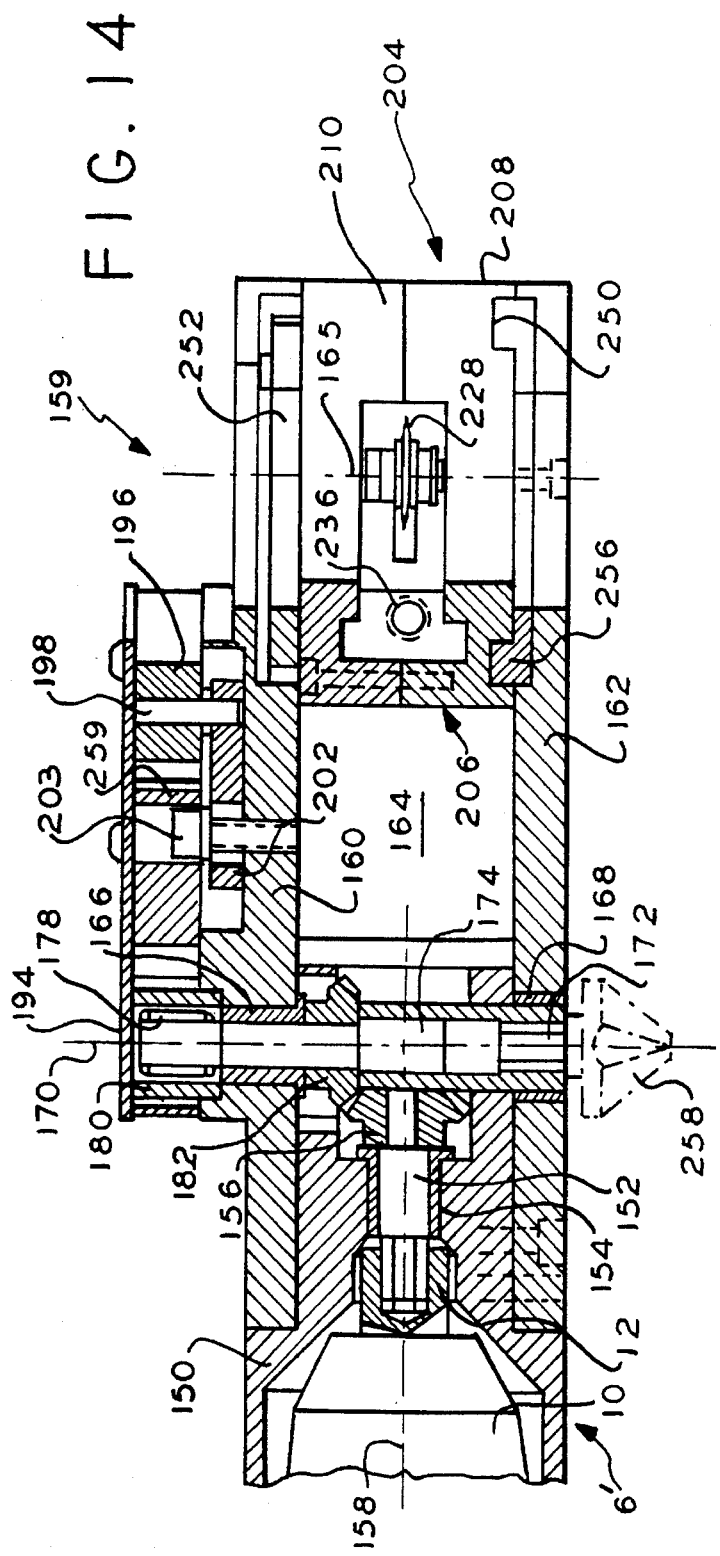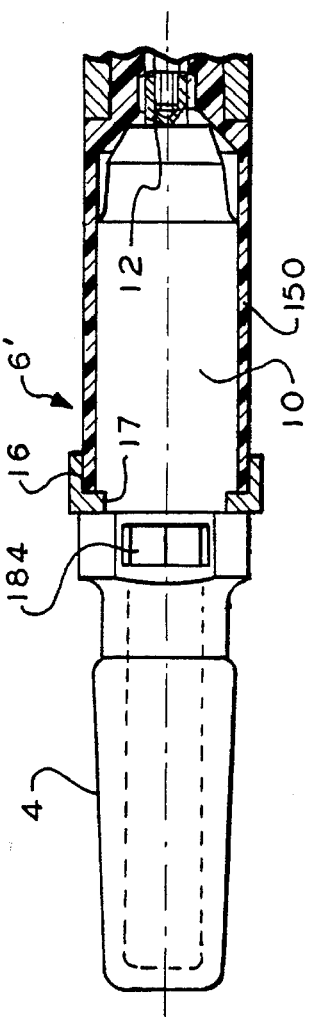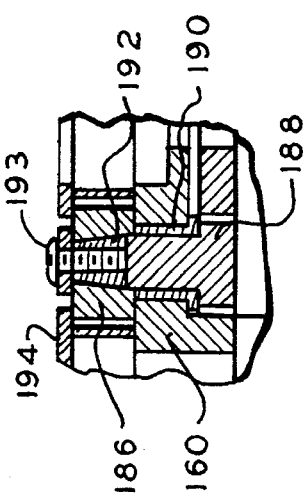

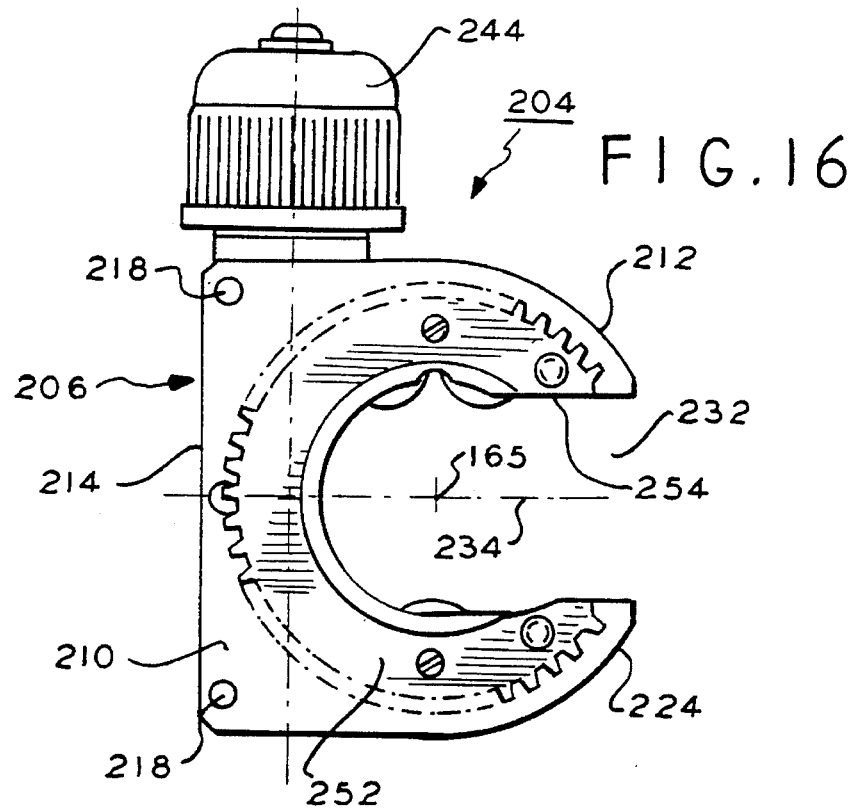
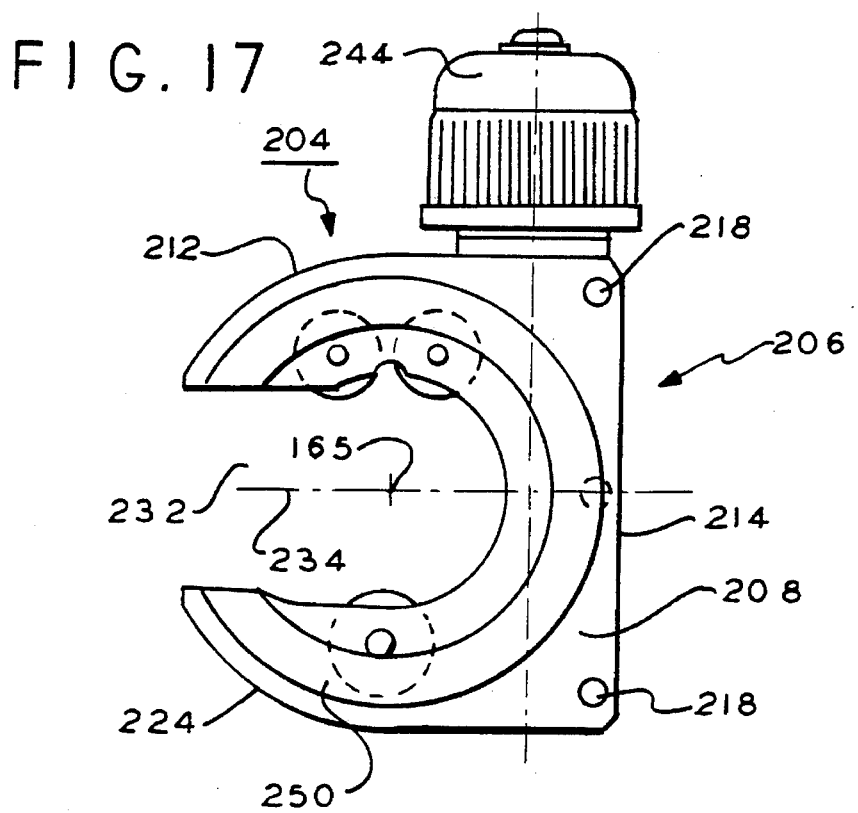

TUBE CUTTER

BACKGROUND OF THE INVENTION

This invention relates to tube cutters, and more particularly, to cutters including a pair of tube supporting and cutting jaws at least one of which jaws is movable and including a force applying device for forcing the jaws together in a pipe cutting mode.

Of interest is copending commonly owned allowed application Ser. No. 08/078,583 entitled Tube Cutter by Dubinsky et al. filed Jun. 17, 1993, now U.S. Pat. No. 5,345,682.

Tube cutters are in wide use and may employ manually operated mechanisms and power operated mechanisms. Manually operated mechanisms of one type employ a rigid anvil with rollers forming one jaw and a manually displacable cutter blade forming the other jaw. The blade is coupled to a threaded shaft which may also included a spring for resiliently loading the shaft. The shaft is turned to provide a tube cutting load on the tube between the blade and rollers. The cutter is then manually rotated about the tube to cut the tube. The shaft is periodically turned to provide further cutting load on the tube as the tube is cut. This type of cutter is disclosed in the aforementioned copending application.

U.S. Pat. No. 5,206,996 discloses a manually operated tube cutter. This patent discloses a cutter with a pair of spring loaded handles each of which forming a jaw, one for carrying rollers and the other a cutting blade. The rollers and blade are biased toward one another by a spring. In a second embodiment, a C-shaped device is disclosed similar to the type of cutter described above. In the latter cutter a spring biases the cutter toward the rollers and supported tube.

U.S. Pat. No. 5,088,196 discloses a power operated tube cutter. In this apparatus no spring is used. In this cutter the roller holder and the cutting blade holder are mounted to a disk in straight-grooves therein for translation toward and away from each other. The disk is mounted for rotation relative to a housing. A spur gear is attached to the disk and rotatably driven by a drive source. The disk and holders in one relative orientation have aligned cutouts for receiving a pipe to be placed between the rollers and blade. The rollers' holder is locked in place with a screw. The cutter blade is radially moved toward the pipe and rollers while the holders for the rollers and blade are rotated by a worm drive mechanism. As the blade and rollers rotate the blade is also driven toward the pipe by the worm mechanism and a friction roller to effect cutting. The drive source is reversed to align the holders with the disk cutout and to remove the cut pipe. Thus the mechanism needs to be power driven in order to engage the cutter blade with the pipe and place the holders under load.

The problem with the above manual devices, as recognized by the present inventors, is that the spring is relatively weak so that the operator may adjust the cutter blade while under spring load. To make the spring relatively stiff to increase the cutting load would make the cutter more difficult to manually manipulate. These are conflicting requirements resolved in favor of employing a weaker spring than desired for providing a cutting load. Also, such manually operated devices are relatively slow and cumbersome to use.

The problem with the power operated device described above is that a clearance must be provided between the rollers, cutter blade and tube in order to insert the tube into the assembly. After assembly, the one holder for the rollers needs to be fixed in place with a screw. This itself is cumbersome to implement since the pipe must be measured first or placed in position to determine the position of the roller holder prior to fixation. Manually loosening and tightening a screw is also cumbersome to implement especially for pipes that are located in awkward and difficult to reach locations.

A further problem recognized by the present inventors is that the power operated cutter blade necessarily must be spaced initially from the pipe in order to position the pipe between the rollers and blade. Thereafter, the power mechanism is operated to cause the blade to displace further and eventually into engagement with the pipe. This is a problem where the location of the cut on the pipe is critical. Because the tool disclosed in this patent is hand held during operation, it is not easy to manually align the cutter blade with a fixed position on the pipe as the mechanism is operated at the same time.

A tube cutter according to one embodiment of the present invention for cutting a circular cylindrical tube about a given axis comprises a housing; first and second jaws defining a tube receiving axis, the jaws including means for supporting and cutting a received tube, the jaws being axially slidably secured to the housing for displacing toward and away from each other; and centering means coupled to the jaws for simultaneously moving and centering the jaws in a first translation mode for positioning the tube receiving axis substantially coaxial with the given axis. Thus in a power operated system defining the given axis, both of the tube cutting and supporting jaws are self centered without additional adjustment.

In a further embodiment, the centering means includes a stem extending into the housing in an axial direction and including first and second threads coupled to a respective corresponding different one of the jaws, the direction of the threads coupled between the first jaw and stem being opposite to the direction of the threads coupled between the second jaw and the stem, the jaws moving simultaneously in the axial direction toward or away from each other upon rotation of the stem in a second translation mode.

In a further embodiment, a tube cutter for cutting a circular cylindrical tube comprises a housing; first and second jaws including means for supporting and cutting a received tube, at least one of the jaws being axially slidably secured to the housing for displacing toward and away from the other jaw; jaw displacement means coupled to the housing and the at least one jaw for axially displacing the at least one jaw with negligible axial load until the jaws engage the received tube in an initial tube cutting position; and load inducement means coupled to the housing and jaw displacement means for providing a resilient tube cutting load on the jaws upon the engagement of the jaws with the tube in the initial cutting position. As a result, a relatively large cutting load can be provided since no load is on the cutter and rollers during initial adjustment to the cutting position.

In a further embodiment, a tube cutter for cutting a circular cylindrical tube comprises handle means; reversible drive means secured to the handle means for selectively driving a shaft in opposite directions; and tube cutter means secured to the handle means for receiving a tube to be cut and coupled to the shaft for rotatably cutting the received tube in response to rotation of the shaft, the drive means including one way clutch means coupled to the shaft and cutter means for driving the cutter means in only one of the opposite directions and permitting the cutter means to freely rotate in the other of the opposite directions with negligible resistance.

In a further embodiment, a tube cutter having manual and power operated modes wherein in the manual mode the cutter is manually rotated about a tube to be cut and in the power mode the cutter is attached to cutter drive means for rotating the cutter about the tube to be cut. The cutter comprises a housing; a pair of jaws coupled to the housing, at least one of the jaws being movable relative to the other jaw for supporting and cutting a tube therebetween; adjustment means for causing the at least one jaw to resiliently approach the other jaw in a tube cutting mode; and means secured to the housing adapted to be coupled to and driven by the drive means.

In a still further embodiment, a tube cutter comprises a housing; a pair of tube supporting and cutting jaws secured to the housing for cutting a tube supported thereby, at least one of the jaws being movable relative to the other jaw; adjustment means for causing the at least one jaw to resiliently approach the other jaw in a tube cutting mode; drive means for rotating the housing, jaws and adjustment means about a first axis; and socket means coupled to the drive means for releasably receiving a tool, the drive means for rotating the socket means about a second axis spaced from the first axis.

IN THE DRAWING

FIGS. 1 and 2 are respective bottom plan and elevation side views of a tube cutter assembly according to one embodiment of the present invention;

FIG. 1a is a sectional enlarged view taken in region 1a of FIG. 2;

FIG. 1b is an isometric view of a quick release device used in the embodiment of FIG. 1a;

FIG. 3 is a more detailed bottom plan view partially in section of a portion of the cutter assembly of FIG. 2 taken along lines 3—3;

FIG. 4 is a top plan view partially in section of a portion of the cutter assembly of FIG. 2 taken along lines 4—4;

FIG. 5 is a side elevation sectional view of the cutter assembly of the embodiment of FIG. 4 taken along lines 5—5;

FIG. 5a is a top plan view of a bearing and flange used in the embodiments of FIGS. 1–5;

FIG. 5b is a side elevation sectional view taken along lines 5b–5b of FIG. 5a;

FIG. 14 is a side elevation sectional view of the embodiment of FIG. 13 taken along lines 14–14;

FIG. 14a is a view similar to that of FIG. 14 showing the handle portion and a sectional view of the drive portion of the cutter assembly used in the embodiment of FIG. 14;

FIG. 15 is a side sectional elevation view of the embodiment of FIG. 13 taken along lines 15—15 illustrating a representative drive gear and pulley arrangement;

FIGS. 16 and 17 are respective top and bottom plan views of a cutter unit used in the embodiments of FIGS. 13–14;

DESCRIPTION OF THE PREFERRED EMBODIMENTS

Figure 6:
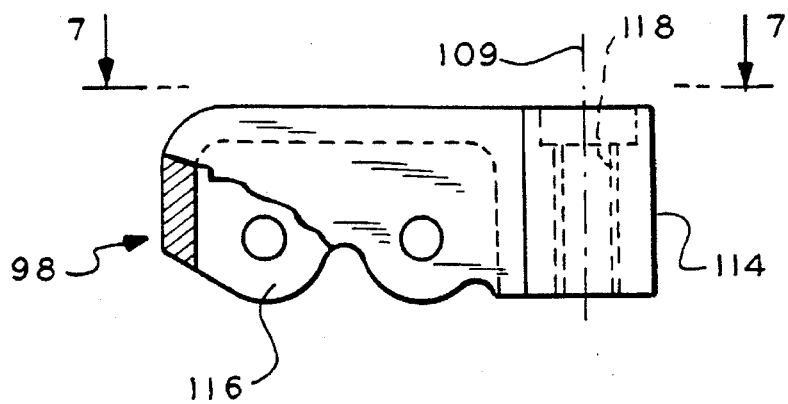
FIG. 6 is a side elevation view partially in section of a roller supporting jaw used in the embodiments of FIGS. 1–5.

In FIGS. 1 and 2, cutter assembly 2 comprises a handle 4, a drive section 6 and a cutter head assembly 8. The handle 4 is hollow and contains a battery (not shown) for powering the cutter assembly 2. The battery is inserted into the handle 4 via a cover (not shown). In FIG. 5, section 6 contains a drive 10 for operating shaft 12. Drive 10 is operated by the battery via toggle switch 14. Switch 14 is coupled to the battery for supplying electrical power to the drive section 6 in two opposite polarities for rotating shaft 12 in corresponding two opposite directions. The handle 4, drive 10 and switch 14 are commercially available as a conventional power operated screw and nut driver unit. The housing 15 of the drive 10, FIG. 5, is an integral, one piece thermoplastic molded unit with the handle 4. The drive 10 housing 15, FIG. 1a, is available as a circular cylinder with two opposite flat sides 17 (one being shown in FIG. 1a). The drive 10, in the embodiment of the present invention, is contained within a preferably molded Nylon housing 28, which may also be metal, e.g., aluminum.

A drive 10 quick release device 16 is slidably connected to the housing 28 of drive section 6. The device 16, FIG. 1b, is U-shaped with a pair of legs 21 and 23 and a leg connecting link 25. A linear lip 27 extends along an edge of each leg 21 and 23. A ridge 29 (one being shown) extends along each leg at an edge opposite its lip 27. Two spaced holes 31 are in leg 21. A ball detent 33 is secured to housing 28 adjacent a corner thereof which has a relatively thicker section of thermoplastic material than the remainder housing 28 sides. The ball of detent 33 selectively engages the holes 31 according to the relative position of the device 16 as shown in solid and phantom lines, FIG. 1.

The leg 21 of device 16 passes through a slot in housing 28 and selectively engages a mating flat side 17 of the drive 10 housing 15. The leg 23 of device 16 selectively engages the other flat side of the housing 15 on the opposite side of housing 15. The ridges 29 are mounted in corresponding grooves in the housing 15 adjacent sides.

In operation of the device 16, when the device 16 is in the position shown in solid lines, FIG. 1, the ball detent engages the hole 31 next to link 25 and the leg 21 engages the flat housing 15 side 17. When so engaged the drive 10 can not rotate relative to the housing 15. When the device 16 is lifted to the position shown in phantom in FIG. 1, the legs 21 disengage the sides 17 and the housing 15 and drive 10 and its housing 15 can rotate within the housing 28 about longitudinal axis 35.

The purpose of the quick release device 16 is to permit the drive 10 when rotatably fixed to the housing 28 to rotate the cutter unit 20 while the handle 4 remains in a relatively fixed orientation. Should the battery fail, the device 16 is positioned as shown in phantom in FIG. 1 such that the handle 4 and drive 10 are decoupled from the housing 28. This permits manual rotation of the handle 4 relative to the housing 28. This manually rotates the cutter unit 20 in the same manner that the drive 10 rotates the cutter unit 20 relative to housing 28 about axis 22 as will be explained in more detail below.

The head assembly 8 comprises a modular cutter drive head 18 to which a cutter unit 20 is secured for operation by the head 18. The cutter unit 20 is rotatably driven about axis 22 by a drive mechanism driven by drive 10 and contained within head 18.

In FIG. 5, coupling shaft 24 is connected to shaft 12 and rotatably driven thereby about axis 35. Shaft 24 rotates in a preferably non-metallic bearing 26 in section 6 of housing 28. A bevel gear 30 is fixed to and driven by shaft 24. A bearing 32 is secured in housing 28 defining axis 36 normal to the shaft 24 rotation axis 35. A bushing 42 is secured to housing 28 spaced from bushing 32 on axis 36. A shaft 44 is rotatably secured in bushing 42 for rotation about axis 36. A hexagonal socket drive sleeve 34 having a hexagonal tool receiving socket 46 is secured to shaft 44 for rotation therewith. The sleeve 34 is rotatably secured in bearing 32.

A deburring tool 50 (shown in phantom) having a shaft 48 is releasably secured in the socket 46 and driven thereby. While a deburring tool is illustrated other tools may be used in the alternative according to a given implementation, e.g., screw drivers, wrenches and so on. Regardless the direction of rotation of the shaft 44, the tool 50 is always rotated therewith in a corresponding direction. A deburring tool typically is used when driven in only one direction whereas other tools such as screw drivers and the like may be driven in opposite directions. Therefore, only one polarity of switch 14 is used for operating the deburring tool.

A bevel gear 52 engaged with gear 30 is secured fixed to shaft 44 between bearing 32 and bushing 42. Gear 52 rotates shaft 44 about axis 36 in response to operation of the drive 10. A commercially available one way roller clutch 54 is secured to an end of shaft 44 opposite bearing 32. Clutch 54 has an outer sleeve (not shown) to which a spur gear 58 is fixed for rotation therewith. When shaft 44 rotates in one direction the gear 58 is coupled to the shaft 44 by the clutch 54 and is driven thereby. When shaft 44 rotates in the opposite direction the gear 58 is decoupled from the shaft 44 and does not rotate.

In a similar context, when shaft 44 is not driven, the clutch couples the gear 58 in one angular direction preventing gear 58 from rotating freely in that direction because of the gear ratios and due to the coupling of the gears to the drive 10. In the opposite direction wherein the gear 58 is decoupled from shaft 44, the gear 58 may freely rotate.

This latter arrangement is important because it allows an oscillating ratchet type of motion in manually rotating the cutter unit 20 about a tube to be cut via the handle 4. That is, the coupling of the gear 58 to the drive section by the clutch provides a relatively high torque resistance on gear 58 in one angular rotation direction and relatively low torque resistance when decoupled in the other direction. This permits the cutter unit to remain in fixed position relative to the head assembly 8 when the cutter unit is loaded by a cutting action during manual rotation of the handle and unit 20 about a tube in the one direction. The operator can return the head assembly to its original position in a reverse direction employing back and forth angular strokes.

In FIGS. 4 and 5, head 18 of assembly 8 includes a side plate 70 fastened to housing 28. A cover 68 is screwed to the plate 70. The bushing 42 and clutch 54 are in plate 70 cavity 56. An idler gear 60 is in a plate 70 cavity and engaged with gear 58. Gear 60 rotates about axis 62 defined by bushing 64 secured about pin 66 secured to plate 70. Plate 70, FIG. 4, has an elongated slot-like opening 74 in communication with the extended end of the plate 70. The slot opening 74 permits a tube 76 (shown in phantom) to be placed in position in direction 71 (with the tube axis normal to the plane of the drawing sheet) for cutting by unit 20 about axis 22 as will be described. Plate 70 and housing 28 may be aluminum. The assembly 8 may be removed from the section 6 as a module. A pair of like spur gears 78 rotate about pins 80 secured to plate 70. Gears 78 engage gear 60.

In FIG. 4, a gear 82 having opening 74' substantially the same as opening 74 in plate 70 is screwed to plate 86. Gear 82 is engaged with and driven by gears 78. In FIG. 5, the plate 70 has a bearing journal 84. A flanged bearing 86 is rotatably mounted in journal 84. Bearing 86 is shown in more detail in FIGS. 5a and 5b. Bearing 86 has a bearing portion 88 which rotatably slides in journal 84. The bearing 86 also has a flange 90 and an opening 91 corresponding to opening 74.

The bearing 86 and gear 82, FIG. 5, are fastened together by screw 87. The gear 82 and bearing 86 capture plate 70 therebetween to secure the unit 20 rotatably to plate 70. The cutter unit 20 is fastened to flange 90. A screw 92 fastens the gear 82 and bearing 86 assembly flange 90 to housing 94 also capturing the plate 70 between the bearing 86 and gear 82. The housing 94 is also fastened to bearing 86 flange 90 via screws 96 (one being shown in FIG. 5).

Figure 10:
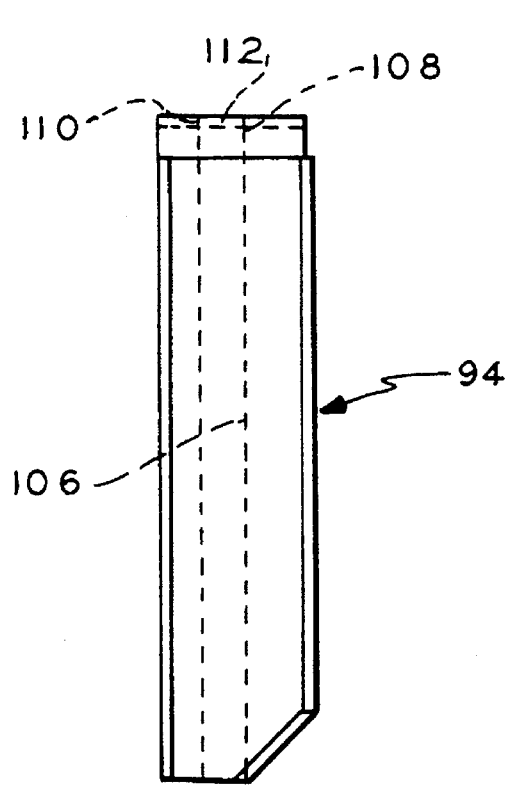
FIGS. 10–12 are respective side, front and top plan views of the cutter housing used to support the jaws of FIGS. 6–9.
Figure 11:
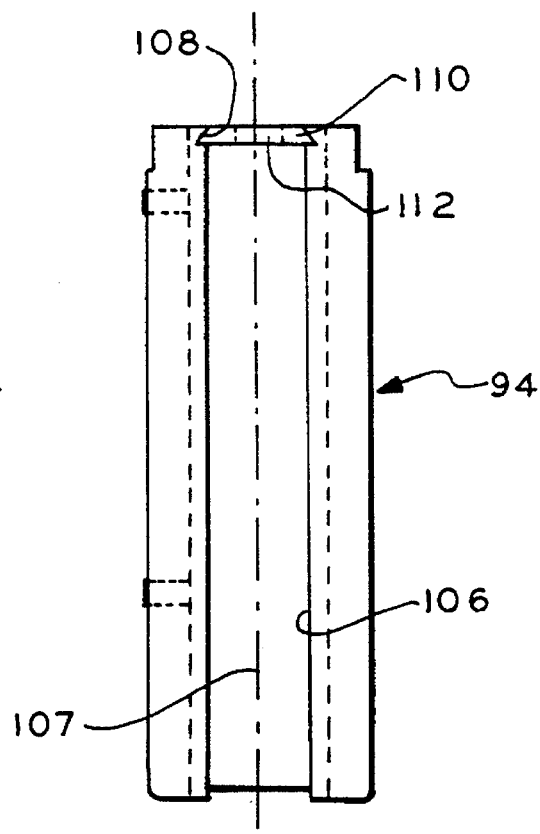
Figure 12:
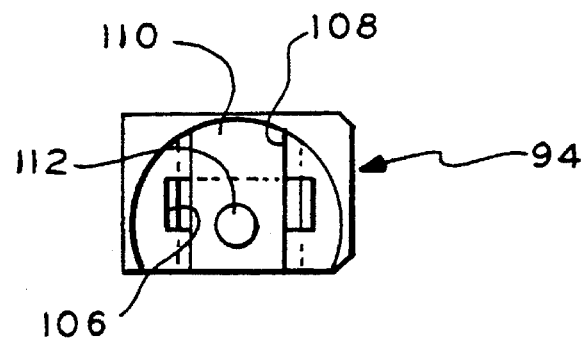

In FIGS. 3 and 6–12, the cutter unit includes housing 94, roller jaw 98 and cutter blade jaw 100. Rollers 102 are rotatably mounted to jaw 98 and blade 104 is rotatably mounted to jaw 100. In FIGS. 10-12 housing 94 has an elongated T-shaped channel 106. At one end of the housing a dovetail slot 108 is formed. A plate 110 is secured in slot 108. The plate 110 has an aperture 112.

Figure 7:
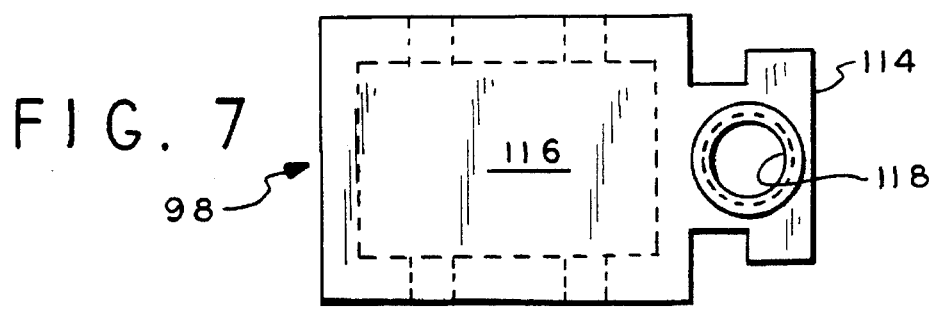
FIG. 7 is a plan view of the jaw of FIG. 6 taken along lines 7–7.
Figure 8:
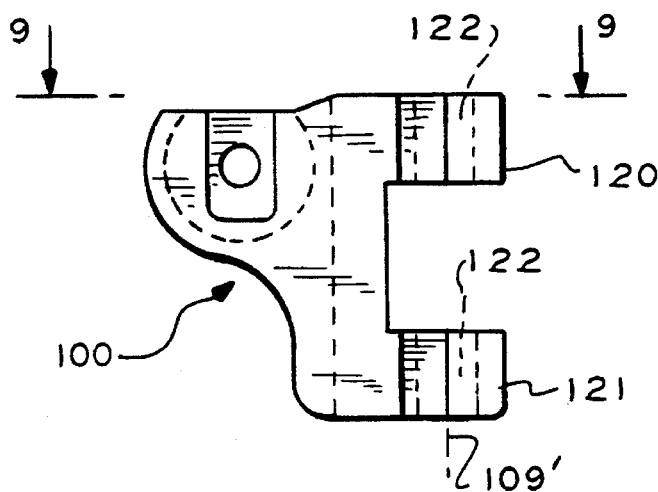
FIG. 8 is a side elevation view of the cutter blade jaw used in the embodiments of FIGS. 1–5.
Figure 9:
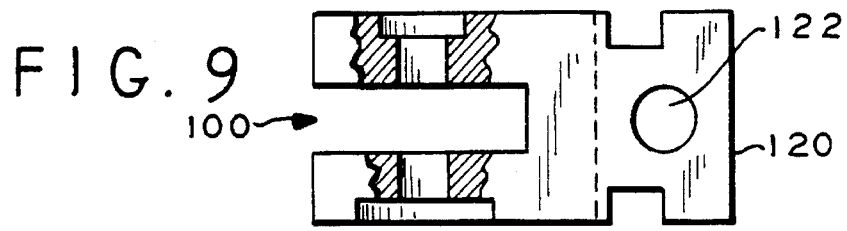
FIG. 9 is a plan view of the jaw of FIG. 8 taken along lines 9–9.

In FIGS. 6–7, jaw 98 is formed with a T-shaped member 114 which is slidably secured in the T-shaped channel 106 of the housing 94 along axis 107. The rollers 102, FIG. 3, are located in cavity 116 of jaw 98. A left hand threaded bore 118 passes through member 114 parallel to the member 114 and defines axis 109. Jaw 100 has a pair of axially spaced like aligned T-shaped members 120 and 121 which are slidably secured in the channel 106 of the housing 94 along axis 107. The members 120 and 121 have identical aligned unthreaded bores 122 on axis 109'. The axes 109 and 109' of respective threaded bore 118 of jaw 98 and the bores 122 of jaw 100 are axially aligned on housing 94 axis 107 when the T-shaped members 114 and 120 are in the channel 106 of the housing 94, FIG. 3.

In FIG. 3, the cutter unit 20 further includes a stem 124 which has left hand threads 126 and right hand threads 128. The stem 124 threads 126 are in the threaded bore 118 and engaged therewith. The stem is also in bores 122 of jaw 100. A nut 130 is threaded to threads 128 of the stem. The threads on the nut 130 are right handed and on the jaw 114 left handed. Nut 130 is in the space between members 120 and 121 of jaw 100. A Bellevelle type spring 132 is between nut 130 and member 120. Spring 132 is an array of relatively stiff spring washers as commercially available. This spring provides a relatively high load upon relatively small deflection thereof. For example, a 0.010 inch deflection per spring for 16 springs produces a load of about 85 pounds with a total deflection of 0.160 inches.

Spring 132 preferably provides a deflection force of about 85 pounds in this embodiment. The load may be greater or less than 85 pounds in other implementations. For example, the force may be in a range of at least 20 pounds to 160 pounds or even greater as desired for a given implementation. This relatively high spring force is used to provide a cutting force on the cutter blade 104 when the rollers 102 and blade 104 engage the tube 76 to be cut.

Stem 124 has a reduced diameter shaft 134 producing a shoulder 136. A washer is on shoulder 136 and a compression spring 138 is on the washer and abuts plate 110. The aperture.112 in the plate 110 (FIG. 12) closely receives the shaft 134 of the stem to preclude the stem and jaws from discharging from the housing 94 channel 106. Compression spring 138 spaces the shoulder 136 from plate 110 which forms a segment of the housing 94 as shown in FIG. 12.

This spacing of the shoulder 136 from plate 110 is important. Because the stem 124 is threaded to the jaw 98 and to the jaw 100 via nut 130, the stem and jaws are free to translate as a unit in the channel 106 of the housing 94. If permitted to translate to a position where the shoulder 136 abuts plate 110, then a binding action occurs. This action occurs when the rollers of jaw 98 engage the tube 76 in the initial tube cutting position of the jaws at which the blade 104 also abuts the tube. Such engagement stops further manual displacement of the jaws toward each other by rotation of the stem 124.

Rotation of the stem is precluded by the abutment of the shoulder 136 and plate 110 because of the threaded engagement of the stem to the jaw 98. Because the jaw 98 is stopped from further approaching the jaw 100 by the tube 76, rotation of the stem at this point causes the stem to translate upwardly in FIG. 3 toward the top of the Figure. If shoulder 136 abuts plate 110, then such translation can not occur and further rotation of the stem to move the jaws together to induce a cutting load on the jaws as will be explained is precluded. Therefore, spring 138, which is a relatively low force, e.g., 5 pounds upon full deflection, permits the shoulder 136 and stem to translate upwardly to permit further rotation of the stem when the rollers 102 abut the tube 76. A knob 140 is secured to the protruding stem end by a screw and a spare cutter 104' between the screw and knob.

In operation, the opening 91 of the bearing 86, opening 74' of gear 82 and opening 74 of the plate 70 are manually aligned as shown in FIGS. 1 and 3. This can be done manually because of the one way clutch 54 discussed above. The clutch permits the cutter unit to be easily manually rotated about axis 22 to obtain this alignment. After the openings are aligned, a tube 76 is passed into the openings onto axis 22. The tube is placed between rollers 102 and blade 104. At this time the knob 140 is rotated to move the jaws together to the position shown in FIG. 3. The jaws move together freely without any spring load present on the jaws. The jaws are factory assembled previously to the housing 94 so that they define a center point therebetween coincident with axis 22.

As the knob 140 is rotated the threaded engagement of the stem 124 to the jaw 98 and to the nut 130 captured by jaw 100 and stiff spring 132 simultaneously moves the jaws in a self centering action on axes 109, 109' towards one another. That is the threads on the nut and jaw 98 are the same pitch but opposite in sense so that the jaws move exactly the same displacement in response to a given rotation of the stem 124. Therefore, the center point between the jaws (the peripheral tangential surface of the rollers 102 and cutter 104 abutting the tube 76) always remains on axis 22.

As mentioned above, the spring 138 spaces the shoulder 136 from plate 110 to permit axial translation of the stem 124 toward the knob 140. As the knob is further rotated after the cutter blade 104 and rollers 102 engage the tube, these elements are substantially stopped from further displacement toward each other. Upon further rotation of the knob in the same direction, the nut 130 is caused to move against stiff spring 132 deflecting this spring because the jaws no longer can move. Also, indicia, not shown, may be used on the nut and housing 94 to indicate nut displacement. The spring 132 is deflected a distance corresponding to the desired cut depth in the tube 76. The spring thus induces a force on the jaw 100 directed toward the tube 76 which can not displace because of the abutment with the jaw 98 rollers.

Because the rollers 102 abut the tube 76 at the time the spring 132 begins to deflect, stopping further movement of the jaw 98, the stem 124 necessarily moves axially toward plate 110. This causes the spring 138 to compress as the shoulder 136 displaces toward plate 110.

The deflected spring 132 induces a relatively high force load on the rollers 102 jaw 98 for cutting the tube. The amount of deflection of the spring 132 corresponds to the depth of the cut of blade 104. The induced cutting force does not dissipate until the spring returns to its fully extended position. This causes the tube to be cut to the desired depth manifested by the spring 132 initial deflection.

It will thus be clear that if the shoulder 136 were to abut plate 110 prior to deflecting the spring 132, the stem 124 could not displace upwardly and the spring 132 could not be deflected to provide the desired induced cutting force on the jaws. Therefore, the spacing of the shoulder, which locks the stem to the housing, must always occur to permit spring 132 to deflect in response to axial displacement of the stem 124 as the stem rotates. The shoulder 136 is necessary to lock the stem 124 and the attached jaws to housing 94 via plate 110.

Once the spring 132 is fully deflected, the switch 14, FIG. 1, is depressed to apply power to the drive in section 6 in the appropriate direction to rotate gear 60, FIG. 4. This in turn rotates gear 82 attached to the cutter unit 20 rotating this unit about axis 22 cutting the tube. At the same time sleeve 34 with socket 46 is also rotated. If desired, a deburring tool 50 is inserted in the socket 46 and is also rotated. This permits, if desired, deburring of the cut tube with tool 50.

It is preferable that the deburring tool 50 be operated in the appropriate direction without operating the cutting unit 20 via the one way clutch 54. To do this, the switch 14 is depressed to activate the appropriate polarity of the power applied to the drive.

Should it be desired to manually cut a tube, the head assembly 8 and cutter unit 20 are placed over a tube to be cut. No power is applied. The one way clutch permits the assembly to be manually oscillated back and forth while moving the cutter blade in one direction only in ratchet fashion.

In a further manual operation, the quick release 16, FIG. 1, is used to release the drive 10 so its housing 15 can be rotated relative to housing 28 as discussed above. The device 16 is displaced to the phantom positon of FIG. 1. In this mode of operation, the user holds the assembly 2 via a strap not shown attached to housing 28. With one hand the user grasps the housing 28 and with the other hand grasps the handle 4, FIG. 1. Rotation of the handle 4 relative to the housing 28 rotates the cutter unit 20 about axis 22.

Figure 13:
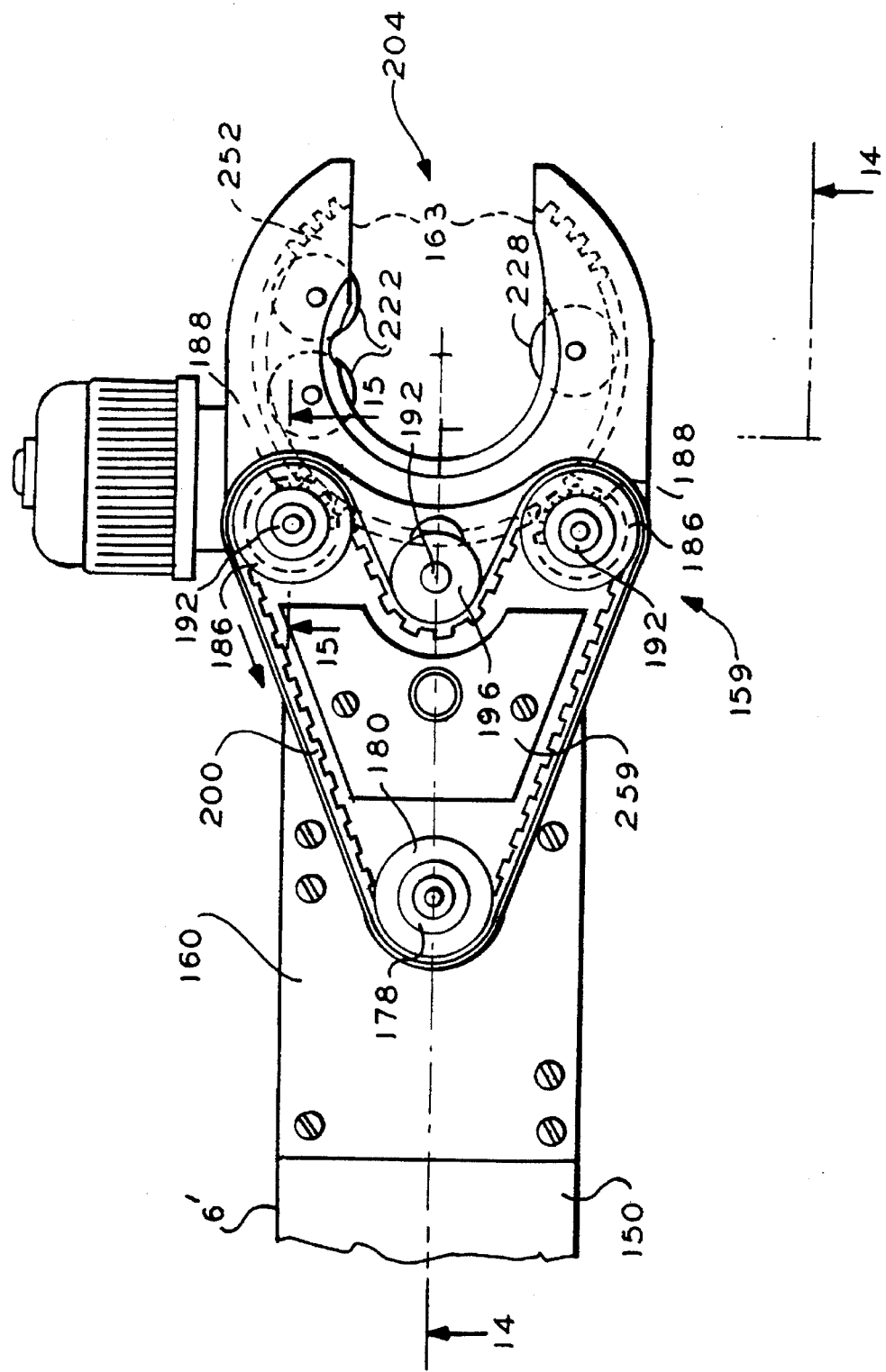
FIG. 13 is a plan view partially in section of the cutter head and drive portion of a second embodiment of the cutter assembly of the present invention.

In FIGS. 13, 14 and 14a, a second embodiment of the present invention includes a drive section 6' having a housing 150 containing a drive 10 having a rotatably driven output shaft 12. In FIG. 14, drive output shaft 12 is connected to shaft 152 rotatably secured in bearing 154 secured to housing 150. A bevel gear 156 is secured to shaft 152 and driven about axis 158.

A head assembly 159 includes side plate 160 removably secured, e.g., screwed, to one side of housing 150 and a second side plate 162 is removably secured to the opposite side of housing 150 spaced from plate 160 and parallel thereto. The housing 150 and plates 160 and 162 form a spaced region 164 therebetween. The plates 160 and 162 have elongated openings 163 extending along axis 158, FIG. 13, and aligned on axis 165, FIG. 14, normal to axis 158. The openings 163 permit insertion of a tube to be cut in a manner described above in connection with the embodiment of FIGS. 1–12.

A bushing 166 is secured to plate 160 and a bearing 168 is secured to plate 162. The bushing 166 and bearing 168 define axis 170. A hexagonal socket 172 is secured to shaft 174 for rotation about axis 170. The socket 172 rotates within the bearing 168 and the shaft 174 is rotatably secured to bushing 166. A one way clutch 178 similar to clutch 54, FIG. 5, is secured to one end of shaft 174. A toothed pulley 180 is secured to clutch 178 for rotation one angular direction by the clutch 178 in which direction the shaft 174 drives the pulley 180. The pulley is decoupled from shaft 174 in the opposite direction and free to rotate in the other opposite direction. A bevel gear 182 is engaged with gear. 156 and secured to shaft 174 for rotatably driving shaft in two opposite directions in accordance with the selected direction employing switch 184, FIG. 14a.

In FIG. 13 two driven toothed pulleys 186 are rotatably secured to plate 160. In FIG. 15, a representative arrangement for securing the pulleys 186 includes a gear 188. The gear 188 is secured for rotation in non-metallic bearing 190 secured to plate 160. The gear 188 has a tapered pin 192 to which pulley 186 with a mating tapered bore is wedge secured. A screw 193 is fastened to pin 192 through a washer over pulley 186 to secure pulley 186 to the pin 192. A cover plate 194 is screwed to plate 160 through spacer 259, FIGS. 13 and 14.

An idler pulley 196 is rotatably secured to pin 198 secured to adjustment plate 202, FIG. 14. A toothed timing belt 200 is engaged with pulleys 180, 186 and 196 as seen in FIG. 13. An adjustment device for adjusting the tightness of the belt 200 includes adjustment plate 202. A screw 203 is used to adjust the axial position of plate 202 along axis 158 and thus the position of idler pulley 196.

A cutter unit 204 is secured to and between the plates 160 and 162 and rotatably driven about axis 165 by gears 188, FIGS. 14 and 15. The cutter unit 204, FIGS. 16–20, includes a housing 206 comprising two mating halves 208 and 210. A roller support jaw 212 is integral with housing 206 body 214 formed by the two halves 208 and 210. Body 214, FIG. 20, has a T-shaped channel 216 extending therethrough. A pair of screws 218 hold the two housing halves together.

Figure 18:
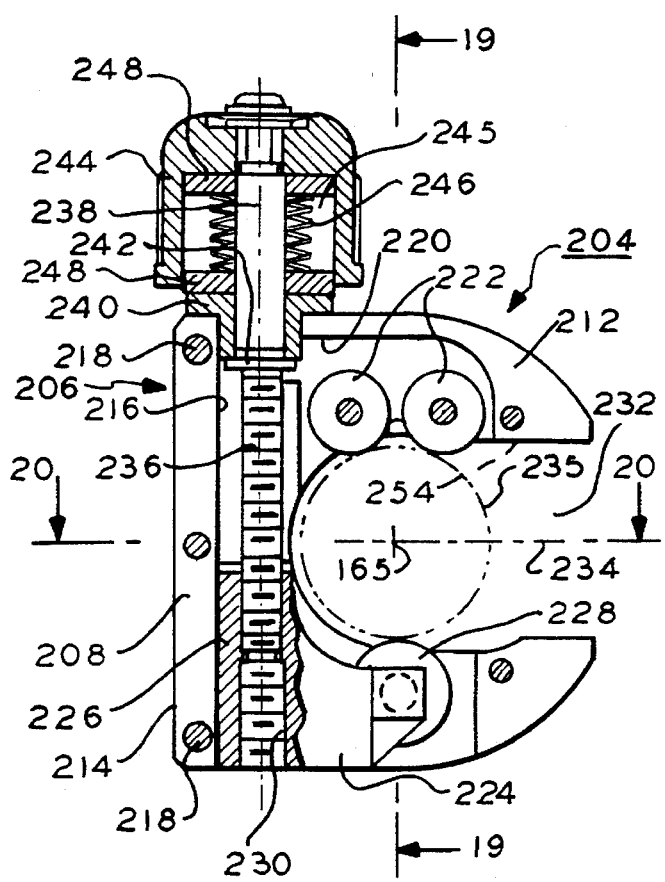
FIG. 18 is a side elevation sectional view of the cutter unit similar to the view of FIG. 16.

Jaw 212 has a cavity 220, FIG. 18, in which two tube support rollers 222 are rotatably secured to jaw 212. A movable jaw 224 has a T-shaped member 226 which mates with the T-shaped channel 216 and slides therein. A circular cutting blade 228 is rotatably secured to jaw 224. Member 226 has a threaded bore 230. The jaws 212 and 224 define an elongated slot-like opening 232 lying on axis 234, corresponding to opening 163 in plates 160 and 162, FIG. 13, for receiving a tube 235, shown in phantom FIG. 18, to be cut.

Figure 19:
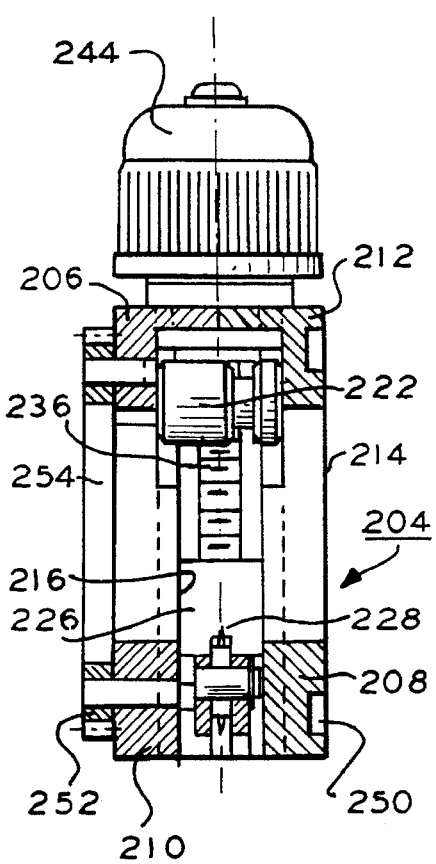
FIG. 19 is a sectional elevation view of the embodiment of FIG. 18 taken along lines 19–19.
Figure 20:
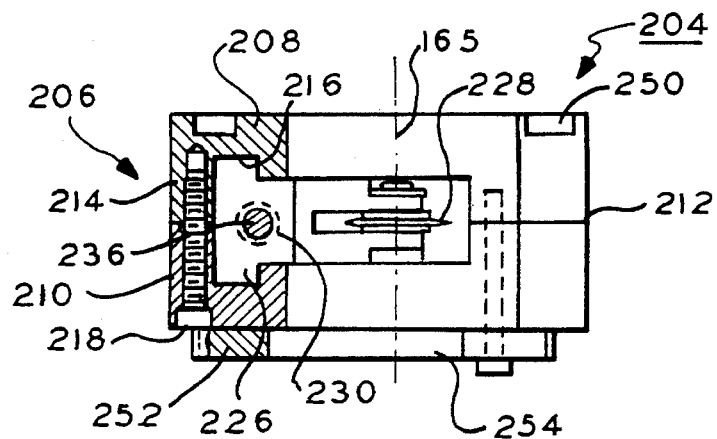
FIG. 20 is a plan sectional view of the embodiment of FIG. 18 taken along lines 20–20.

In FIGS. 18–20, A threaded stem 236 is threaded to bore 230 of jaw 226. The stem 236 has a shaft portion 238, FIG. 18, which passes through bushing 240 secured to housing 206 aligned with channel 216. The stem 236 has a collar 242. A knob 244 is secured to an end of stem shaft portion 238. The knob has a cavity 245. A tube cutting force inducing spring 246 is in cavity 245 secured about shaft portion 238 between a pair of washers 248.

Housing half 208 has an annular channel 250. A gear 252 having an elongated opening 254 aligned with opening 232 in the jaws is secured to the outer side of housing half 210. In FIG. 14, a bearing 256 is secured in a cavity in plate 162 and in annular channel 250 of the housing half 208. The gear 252 meshes with the gears 188 (FIG. 15) and is rotatably driven thereby.

In operation, the cutting unit 204, FIGS. 16–20, may be operated independently of the power drive source and separated therefrom as shown in FIGS. 16-20. In this mode the cutting unit 204 is manually operated. In FIG. 18, a tube to be cut is mounted between the jaws 212 and 224. The knob 244.is then rotated to rotate stem 236 which moves the jaw 224 toward the fixed jaw 212. The spring 246 is not compressed at this time and the jaws are moved together without spring load.

When the rollers 222 and cutter blade 228 engage the received tube 235, further rotation of the knob 244 compresses the spring 246. This compression provides a tube coating force on the jaws. The deflection distance of the spring corresponds to the cutting depth of the blade 228. As long as the spring is compressed, the blade 228 will cut into the tube 235. The cutter unit is manually rotated about the tube 235 to cut the tube. Preferably the threads in bore 230 are right handed.

To power operate the cutter unit 204, the unit is assembled to the power drive head assembly 159, FIGS. 13 and 14. To assemble the unit 204 to the head assembly 159, plate 162, FIG. 14, is removed. The gear 252 is then placed in engagement with the drive gears 188 (FIG. 15). In FIG. 14, the bearing 256 is then placed in the channel 250 in the cutter unit 204. Plate 162 is then reattached as shown in FIG. 14.

The switch 184, FIG. 14a is then depressed. Depending on which polarity is selected the unit 204 is selectively driven while the socket 172 is always driven. A tool 258, FIG. 14, if attached to the socket 172 is rotatably driven thereby. Assuming the cutter unit 204 is also selected to be driven, the entire unit 204 is rotated about axis 165 by the engagement of gear 252 with gears 188 by belt 200 and shaft 174 via clutch 178. If the opposite polarity is selected the clutch 178 is decoupled from the belt 200 and the unit 204 is not driven.

It will occur to one of ordinary skill that various modifications may be made to the disclosed embodiments. It is intended that the description is by way of illustration and not limitation. For example, the unit 204 of FIG. 13 may be modified for use in the embodiment of FIGS. 1 and 2. Also, a self centering unit such as unit 20 of FIGS. 1 and 2 may be used with the embodiment of FIG. 13. Also, while gears and pulleys are shown as drive links, other drives may be used such as rotatably driven shafts with universal joints and so on. The scope of the invention is defined by the appended claims.

What is claimed is:

1. A tube cutter for cutting a circular cylindrical tube comprising:

handle means;

power operated drive means secured to the handle means; and tube cutter means secured to the handle means for receiving a tube to be cut and responsive to the drive means for cutting the received tube, said tube cutter means including means for rotating the cutter means about an axis in response to the drive means, said cutter means including first and second jaws including means for supporting and cutting a received tube, said cutter means including centering means coupled to said jaws for simultaneously moving and centering said jaws for positioning said received tube concentric with said axis.

2. The cutter of claim 1 including means for selectively operating said drive means in opposing directions.

3. The cutter of claim 1 wherein the drive means includes one way clutch means for coupling the cutter means to the drive means for rotation in only one angular direction about the axis and decoupling the cutter means from the drive means in the opposite angular direction for permitting the cutter means to be manually rotated about the axis in a direction opposite the one angular direction independent of the drive means.

4. The cutter of claim 1 wherein the cutter means includes a housing for axially slidably receiving the jaws, said centering means including means for simultaneously displacing the jaws in opposing directions in a first translation mode.

5. The cutter of claim 4 wherein the cutter means includes means for axially displacing the jaws simultaneously in the same direction in a second translation mode.

6. The cutter of claim 4 wherein the cutter means includes a stem extending in an axial direction and including first and second threads coupled to a respective corresponding different one of said jaws, the direction of the threads coupled between the first jaw and stem being opposite to the direction of the threads coupled between the second jaw and the stem, said jaws moving simultaneously in the axial direction toward or away from each other upon rotation of the stem in a second translation mode.

7. The cutter of claim 6 including a knob secured to the stem wherein the threads coupled to the jaw and stem proximal the knob are left handed and the threads coupled to the other jaw and stem are distal the knob and are right handed.

8. The cutter of claim 6 including a knob secured to one end of the stem, the first threads are formed in the stem and in the first jaw proximal to the knob and the second threads are formed in the stem distal the knob, the cutter means including a nut threaded to the stem second threads and movably secured to the second jaw for causing axial displacement of the second jaw in response to relative rotation of the stem, and a spring secured to the second jaw and coupled to the nut such that displacement of the nut in response to rotation of the stem compresses the spring only after the jaws engage a received tube in a tube cutting position for providing a resilient tube cutting load on said jaws after said engagement.

9. The cutter of claim 8 wherein axial translation displacement of the stem simultaneously axially displaces the first and second jaws therewith in the first translation mode, the threaded engagement of the stem to one of the jaws after engagement of the jaws with the tube causing axially displacement of the stem in response to rotation thereof during tube cutting positioning of said jaws in the second translation mode, said stem having a shoulder which may abut the housing in one axial stem position in the first translation mode precluding said .stem axially displacing in the second mode, said cutter means including spacer means for spacing the shoulder from said housing to preclude abutment of the stem shoulder to the housing to permit axial displacement of the stem in the second translation mode.

10. The cutter of claim 9 wherein the spacer means comprises resilient means between the shoulder and the housing.

11. The cutter of claim 6 wherein the cutter means a housing has a channel, the jaws including interlock means engaged with the channel and slidably secured for axial displacement in the channel, a knob secured to one stem end for manually rotating the stem, the first jaw being distal the knob and having a cavity, said stem having a portion with the first threads in said cavity, a nut interlocked in said cavity in the axial direction and threaded to the stem portion, a spring in the cavity between the nut and first jaw in a direction relatively proximal the knob, the stem having a reduced transverse dimension portion passing through a housing segment and forming a shoulder between the second threads and the knob for securing the stem to the housing.

12. The cutter of claim 11 wherein the housing segment is a plate interlocked with the housing to preclude displacement of the plate in the axial direction.

13. The cutter of claim 1 including tool socket means coupled to said drive means for rotating in response to said drive means, said socket means for selectively releasably receiving a tool to be rotatably operated by said drive means.

14. A tube cutter for cutting a circular cylindrical tube about a given axis comprising:

a housing wherein the given axis is in a fixed position relative to the housing;

first and second jaws defining a tube receiving axis, said jaws including means for supporting and cutting a received tube, said jaws each being slidably secured to the housing for displacing toward and away from each other and from said given axis; and centering means coupled to said jaws for simultaneously moving and centering said jaws in a first translation mode for positioning said tube receiving axis substantially coaxial with the given axis.

15. The cutter of claim 14 including means secured to the housing for rotating the housing about said given axis.

16. The cutter of claim 14 wherein the centering means includes a stem extending into the housing in an axial direction and including first and second threads coupled to a respective corresponding different one of said jaws, the direction of the threads coupled between the first jaw and stem being opposite to the direction of the threads coupled between the second jaw and the stem, said jaws moving simultaneously in the axial direction toward or away from each other upon rotation of the stem in a second translation mode.

17. The cutter of claim 16 including a knob secured to one end of the stem, the first threads are formed in the stem and in the first jaw proximal to the knob and the second threads are formed in the stem distal the knob, the centering means including a nut threaded to the stem second threads and movably secured to the second jaw for causing axial displacement of the second jaw in response to relative rotation of the stem, and a spring secured to the second jaw between the nut and the second jaw in the axial direction and relatively proximal the first jaw such that displacement of the nut in response to rotation of the stem compresses the spring only after the jaws engage a received tube for providing a resilient tube cutting load on said jaws.

18. The cutter of claim 17 including means for securing the nut to the housing such that axial translation displacement of the stem simultaneously axially displaces the first and second jaws therewith in a second translation mode, said stem axially displacing in response to rotation thereof during tube cutting positioning of said jaws in the second translation mode after the jaws engage the tube, said stem having a shoulder which may abut the housing in one axial stem position in the first translation mode precluding said stem axially displacing in the second mode, said cutter means including spacer means for spacing the shoulder from said housing to preclude abutment of the stem shoulder to the housing to permit axial displacement of the stem in the second translation mode.

19. The cutter of claim 14 including resilient means for providing a resilient tube cutting load on said jaws only after the jaws engage the tube to be cut.

20. A tube cutter for cutting a circular cylindrical tube comprising:

a housing;

first and second jaws including means for supporting and cutting a received tube, at least one of said jaws being axially slidably secured to the housing for displacing toward and away from the other jaw;

jaw displacement means coupled to said housing and the at least one jaw for axially displacing the at least one jaw with negligible axial load until the jaws engage the received tube in an initial tube cutting position; and load inducement means coupled to the housing and jaw displacement means for providing a resilient tube cutting load on said jaws upon the engagement of the jaws with the tube in the initial cutting position.

21. The cutter of claim 20 wherein the displacement means comprises a threaded stem rotatably secured to the housing and threaded to the at least one jaw and the load inducement means comprises a compressible spring coupled between the housing and the stem.

22. The cutter of claim 21 wherein the tube has a wall thickness, said spring having a minimum compression displacement of at least the wall thickness to provide a resilient relative displacement of the jaws of at least said thickness to thereby permit cutting through said wall.

23. The cutter of claim 20 wherein the displacement means comprises a threaded stem rotatably secured to the housing and threaded to the at least one jaw, the load inducement means comprises a nut coupled to the at least one jaw and threaded to the stem, and a spring coupled to the nut and the at least one jaw, the nut being arranged to compress the spring only after the jaws engage the received tube for providing said load on the jaws.

24. The cutter of claim 23 further including a knob secured to a stem end, means for securing each said jaw for displacement relative to the housing including thread means coupled to the jaws and stem for simultaneously displacement of the jaws toward and away from each other upon rotation of the stem, an aperture in the housing through which the stem passes, the aperture being axially adjacent to one of said jaws, said stem having a shoulder between the aperture and the adjacent one jaw, and spring means between the shoulder and the housing at said aperture for spacing the shoulder from the housing.

25. The cutter of claim 24 including a plate secured to the housing between the knob and spring and having said aperture therein for securing the stem to the housing.

26. The cutter of claim 20 wherein the load inducement means comprises at least one spring for providing an axial load on the at least one jaw.

27. A tube cutter for cutting a circular cylindrical tube comprising:

handle means;

reversible power operated drive means secured to the handle means for selectively driving a shaft in opposite directions; and tube cutter means secured to the handle means for receiving a tube to be cut and coupled to the shaft for rotatably cutting said received tube in response to rotation of the shaft, said drive means including one way clutch means coupled to the shaft and cutter means for driving said cutter means in only one of said opposite directions and permitting the cutter means to freely rotate in the other of said opposite directions with negligible resistance.

28. The cutter of claim 27 further including tool receiving socket means coupled to said drive means shaft for rotating a received tool independently of the rotation of the cutter means.

29. The cutter of claim 28 wherein the socket means is coupled to the shaft for rotation in response thereto in opposite directions.

30. The cutter of claim 28 further including a tool received in said socket means.

31. A tube cutter having manual and power operated modes wherein in the manual mode the cutter is manually rotated about a tube to be cut and in the power mode the cutter is attached to cutter drive means for rotating the cutter about the tube to be cut, the cutter comprising:

a housing;

a pair of jaws coupled to the housing, at least one of the jaws being movable relative to the other jaw for supporting and cutting a tube therebetween;

adjustment means for causing the at least one jaw to resiliently approach the other jaw in a tube cutting mode; and means secured to the housing adapted to be coupled to and driven by the drive means.

32. The cutter of claim 31 wherein the drive means includes rotatable gear means, the means secured to the housing includes a gear secured to the housing and positioned to engage the gear means so as to rotate about an axis in response to rotation of the gear means.

33. The cutter of claim 32 wherein the drive means includes journal means defining said axis, said cutter including a bearing secured thereto and dimensioned to mate with the journal means for rotating the cutter about said axis.

34. The cutter of claim 33 wherein the housing has opposing sides, said gear being secured to the housing on one of the housing sides and the bearing being secured to the housing on the other of the housing sides.

35. The cutter of claim 31 wherein the cutter includes load inducement means for causing the at least one jaw to freely move relative to the other jaw until the jaws engage the tube to be cut and to provide a resilient cutting load on said jaws after said engagement such that the jaws cut the tube as the cutter is rotated about the tube.

36. The cutter of claim 35 wherein the load inducement means comprises a spring coupled to the housing such that the spring only compresses after the jaws engage the tube as the at least one jaw is displaced toward the other jaw.

37. A tube cutter comprising:

a housing;

a pair of tube supporting and cutting jaws secured to the housing for cutting a tube supported thereby, at least one of the jaws being movable relative to the other jaw;

adjustment means for causing the at least one jaw to resiliently approach the other jaw in a tube cutting mode;

drive means for rotating the housing, jaws and adjustment means about a first axis; and socket means coupled to the drive means for releasably receiving a tool, said drive means for rotating the socket means about a second axis spaced from the first axis.

38. The cutter of claim 37 wherein the drive means includes reversing means for reversing the direction of rotation of the socket means.

39. The cutter of claim 38 including clutch means coupled to the drive means for selectively rotating the housing, jaws and adjustment means in one direction about the first axis and decoupling the housing, jaws and adjustment means from the drive means in a second-opposite direction about the first axis.

40. A tube cutter comprising:

a handle;

a power operated drive assembly including a cutter drive secured to a first housing fixed to the handle;

a second housing selectively secured to the first housing to permit the drive and the first housing to be rotated relative to the second housing in one mode and to fix the first housing to the second housing in a second mode; and.

cutter unit means for cutting a tube in response to relative rotation of the cutter unit means to the tube, said cutter unit means being coupled to the cutter drive for rotation relative to the housings in response to power applied to the drive in the second mode and for rotation relative to the housings in the one mode by manual rotation of the handle and first housing relative the second housing.

41. The cutter of claim 40 wherein the cutter includes release means secured to the second housing and coupled to the first housing for selectively permitting the first housing and handle to be rotated relative to the second housing in the second mode and for fixing the first and second housings to each other in the first mode.

* * * * *